Sept. 4, 1923.

F. E. PAYNE

METALLIC PACKING

Filed Jan. 26, 1920

1,466,806

Inventor
Frank E. Payne.
By Sheridan, Jones Sheridan and Smith
Attys.

Patented Sept. 4, 1923.

1,466,806

UNITED STATES PATENT OFFICE.

FRANK E. PAYNE, OF GLENCOE, ILLINOIS, ASSIGNOR TO CRANE PACKING COMPANY, OF CHICAGO, ILLINOIS, A CORPORATION OF ILLINOIS.

METALLIC PACKING.

Application filed January 26, 1920. Serial No. 354,146.

*To all whom it may concern:*

Be it known that I, FRANK E. PAYNE, a citizen of the United States, residing at Glencoe, in the county of Cook and State of Illinois, have invented certain new and useful Improvements in Metallic Packing, of which the following is a specification.

My invention relates to improvements in metallic packing, such as is used in steam engines, pumps, and elsewhere to prevent leakage of liquids, steam, and gases.

The object of the present invention is to provide a flexible metallic packing which is reinforced by an outer covering to assist in retaining its shape, and to provide a harder wearing surface.

In the accompanying drawings I have illustrated one embodiment of the invention, in which—

Figure 1:
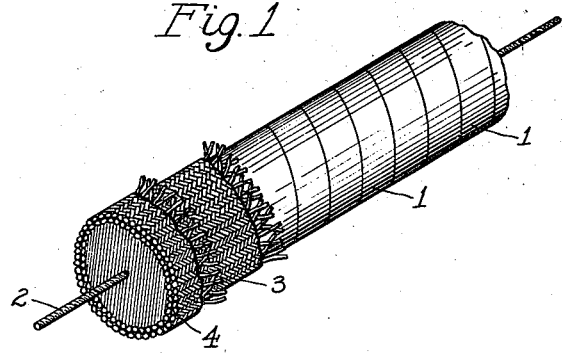
Figure 1 is a perspective view, showing the method of manufacturing the packing.

The main body of the packing is essentially metallic, and sufficiently flexible to enable it to be readily bent to circular form or to be compressed in order to fit within a given enclosure. A body suitable for such purpose may be made by winding metal foil 1, such as lead, copper, aluminum, Babbitt, or other non-abrasive metals, singly or in compounds, back and forth helically on a suitable core 2, which may be a string, wire, or other non-abrasive material. In some cases the metal foil has graphite applied thereto during the winding. A body thus formed is flexible, and adapted for many different uses. In order to reinforce the packing to better adapt it for certain classes of service, I enclose it in a coating or covering of material which is preferably somewhat harder than the body of the packing, although non-abrasive, and which is also flexible. For example, this covering may be made of braided wire, the wire being made, preferably, of copper, although lead or other material may be employed and the cross section of the individual strands need not necessarily be circular. Such a coating is shown in the drawings as being made of braided copper wire.

Figure 2:
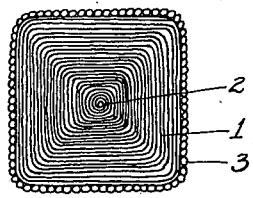
Fig. 2 is a sectional view of the completed packing.
Figure 3:
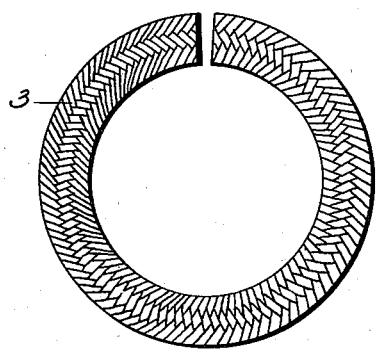
Fig. 3 is a plan view of a packing ring.
Figure 4:
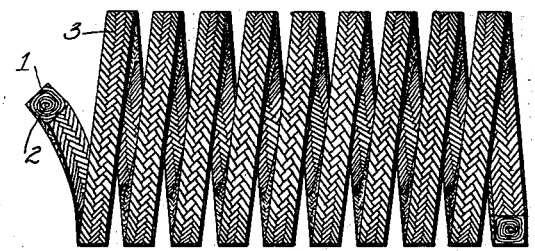
Fig. 4 is a length of packing coiled for shipment.

After the coating has been braided on to the body of the packing, the completed packing may be passed between rollers, or otherwise pressed to give it a rectangular outline, as shown in Fig. 2, or it may be given any other desired cross-sectional form. The packing may then be cut to length and bent to circular form, as shown in Fig. 3, or it may be coiled for shipment, as in Fig. 4.

A braided covering, such as described, does not impair the flexibility of the packing, and affords sufficient initial reinforcement to enable the packing to withstand considerable deformation and severe service, due to the harder wearing face.

For especially severe service, such as arises when the packing is used with high speed engines, it is desirable to apply more than one braided covering, as shown by the outer covering 4, in Fig. 1.

I claim as my invention:

1. A metallic packing comprising a helical roll of metal foil and a reinforcing covering of braided wire.

2. A metallic packing comprising a body of superimposed layers of thin sheet metal and a thin reinforcing covering therefor of braided material which is soft as compared to the material of the joint to be packed.

3. A packing comprising a core, flat metal ribbon wound thereon and a covering of interwoven strands of comparatively soft metal forming a non-abrasive covering.

4. A metallic packing comprising a body consisting of a helical roll of lead-foil and a covering of braided copper wire.

5. A metallic packing comprising superimposed helical layers of metal foil and a closely braided covering of wire of comparatively soft material.

In testimony whereof I have subscribed my name.

FRANK E. PAYNE.